US007016118B2

(12) United States Patent
Wada

(10) Patent No.: US 7,016,118 B2
(45) Date of Patent: Mar. 21, 2006

(54) ZOOM LENS AND IMAGE PROJECTION APPARATUS HAVING THE SAME

(75) Inventor: Ken Wada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/916,122

(22) Filed: Aug. 11, 2004

(65) Prior Publication Data

US 2005/0036206 A1 Feb. 17, 2005

(30) Foreign Application Priority Data

Aug. 11, 2003 (JP) ............................ 2003-207159

(51) Int. Cl.
*G02B 15/14* (2006.01)

(52) U.S. Cl. ...................................... 359/676; 359/680

(58) Field of Classification Search ................ 359/676, 359/680–682, 683, 649–651

See application file for complete search history.

(56) References Cited

U.S. PATENT DOCUMENTS 6,496,310 B1 * 12/2002 Fujimoto .................... 359/680
6,636,361 B1 * 10/2003 Wada ......................... 359/680
6,785,055 B1 * 8/2004 Nishikawa et al. ......... 359/681
2001/0050818 A1 12/2001 Wada et al. ................ 359/649

FOREIGN PATENT DOCUMENTS

JP 2001-108900 4/2001
JP 2001-235679 8/2001

* cited by examiner

*Primary Examiner*—Jordan M. Schwartz
(74) *Attorney, Agent, or Firm*—Morgan & Finnegan, LLP

(57) ABSTRACT

The present invention discloses a zoom lens which reduces the size of an entire lens system, effectively corrects various types of aberration accompanying zooming and has good optical performance over the entire screen. The zoom lens comprises, in order from a front side to a rear side, a first lens unit having a negative refractive power, a second lens unit having a positive refractive power, a third lens unit having a positive refractive power, a fourth lens unit having a negative refractive power, a fifth lens unit having a positive or negative refractive power and a sixth lens unit having a positive refractive power and satisfies the set forth conditions.

19 Claims, 12 Drawing Sheets

ZOOM LENS AND IMAGE PROJECTION APPARATUS HAVING THE SAME

BACKGROUND OF THE INVENTION

1. Field of the Invention

The present invention relates to a zoom lens. For example, this is a compact zoom lens which comprises, a long back focus at a wide field angle and an excellent pupil compliance with an illumination system is kept, and the compact zoom lens is preferably used for a high-resolution liquid crystal projector, and a mobile liquid crystal projector in particular.

In addition, the present invention also relates to a zoom lens having high optical performance best suited to a camera (optical apparatus) with a relatively long back focus among a lens shutter camera, video camera, digital camera, etc.

2. Description of the Related Art

Conventionally, there are various proposals on a liquid crystal projector (image projection apparatus) which uses a display element such as a liquid crystal display element to project an image based on the display element onto a screen surface.

Especially, a liquid crystal projector is widely used as an apparatus capable of projecting an image of a personal computer, etc., onto a large screen for meetings and presentations, etc.

A 3-plate type color liquid crystal projection apparatus using three liquid crystal display elements needs to provide a space for arranging elements such as a dichroic prism which combines color light components modulated by a liquid crystal display element and a polarizing plate between the liquid crystal display element and a projection lens, which requires a back focus of a determinate length to be secured with respect to the projection lens.

A projection optical system (projection lens) used for a color liquid crystal projector is required:

- to be a so-called telecentric optical system with a pupil on the liquid crystal display element (demagnifying) side arranged at infinity to secure excellent compliance of the pupil with an illumination system so as to minimize an influence of angle dependency of a color combining film provided on the dichroic prism;
- when pictures (images) of three color liquid crystal display elements are combined and projected onto a screen, to superimpose pixels of the three colors on one another over the entire screen to prevent characters, etc., on a personal computer from appearing doubled, reducing the level of resolution or deteriorating quality, which requires color shifts (chromatic aberration of magnification) generated by the projection lens to be sufficiently corrected in a wideband of visible light; and
- to also correct distortion, preventing the projected image from being distorted on the contours and becoming visually undesirable.

Furthermore, there is recently not only a demand for a screen with high brightness and an image with high resolution but also a demand for reductions in size and weight of an apparatus with importance attached to maneuverability and portability of a projector provided with a small panel.

As a projection lens for a liquid crystal projector, there is conventionally a proposal on a 6-unit zoom lens which consists of a total of six lens units; first to sixth lens units having negative, positive, positive, negative, positive (or negative) and positive refractive powers in order from the magnifying side (front side) and performs zooming by moving a predetermined lens unit appropriately (e.g., Japanese Patent Application Laid-Open No. 2001-235679 corresponds to U.S. Patent Application Publication No. 2001-0050818).

This 6-unit zoom lens fixes the first and sixth lens units during zooming and moves all the second to fifth lens units in the lens system toward the demagnifying conjugate side (rear side) during zooming from the wide-angle end to the telephoto end, and therefore the overall lens length during zooming is kept constant and is designed to be telecentric with reduced distortion and chromatic aberration during zooming.

As another projection lens for a conventional liquid crystal projector, there is a proposal on a 6-unit zoom lens which consists of a total of six lens units; first to sixth lens units having negative, positive, positive, negative, positive and positive refractive powers in order from the magnifying side (front side) and performs zooming by moving a predetermined lens unit appropriately (e.g., Japanese Patent Application Laid-Open No. 2001-108900). This 6-unit zoom lens fixes the first, fourth and sixth lens units and moves the second, third and fifth lens units in the lens system during variation of magnification from the wide-angle end to the telephoto end, and therefore an overall lens length is kept constant and is designed to be telecentric repressing variations in various types of aberration such as chromatic aberration during variation of magnification.

Together with the demand for further downsizing of a liquid crystal projector, there is currently a strong demand for the ability to realize short-distance projection which constitutes a great merit for a home theater in particular, that is, a liquid crystal projector with a wider field angle.

There is also a demand for a projection lens with a large aperture ratio for the purpose of providing higher brightness for a projected image.

The 6-unit zoom lens disclosed in U.S. Patent Application Publication No. 2001-0050818 arranges a lens unit having a positive refractive power on the most magnifying side (front side), and therefore it is advantageous for correcting distortion. However, since the diameter of a front lens unit, etc., increases and a glass material with a small refractive index is selected for the sixth lens unit added to the most demagnifying side (rear side), there is a tendency that it is difficult to correct aberration of off-axis light beams in particular.

SUMMARY OF THE INVENTION

It is an object of the present invention to provide a zoom lens preferably applicable to a liquid crystal projector which reduces the size of the overall lens system, optimally corrects various types of aberration accompanying zooming and provides high optical performance over the entire screen, and an image projection apparatus comprising such a zoom lens.

It is another object of the present invention to provide a zoom lens preferably applicable to an optical apparatus such as a video camera, film camera or digital camera which forms image information on image-pickup surface such as a film and CCD.

In order to attain the above described objects, the zoom lens according to an embodiment of the present invention comprises, in order from a front side to a rear side:

a first lens unit having a negative refractive power;

a second lens unit having appositive refractive power;

a third lens unit having a positive refractive power;

a fourth lens unit having a negative refractive power;

a fifth lens unit; and a sixth lens unit having a positive refractive power, the sixth lens unit including at least one positive lens element, wherein at least four lens units of the zoom lens move during zooming from a wide-angle end to a telephoto end and the zoom lens satisfies the following conditions:

$$0.00<o1/L1<0.38$$

$$-0.015<\theta gF-(0.6438-0.001682\nu d)<0.04$$

where o1 represents a distance from a surface vertex on the most front side of the first lens unit to a position of a principal plane on the front side, L1 represents an overall length of the first lens unit, νd represents an average Abbe number of a material of the at least one positive lens element of the sixth lens unit and is defined as νd=(nd−1)/(nF−nC), θgF represents an average partial dispersion ratio and is defined as θgF=(ng−nF)/(nF−nC), and ng, nd, nF, nC represent refractive indices of the material with g-, d-, F-, C-lines.

In addition, various modes of the invention will become more apparent from the embodiments which will be described later.

DETAILED DESCRIPTION OF THE PREFERRED EMBODIMENTS

Figure 1:
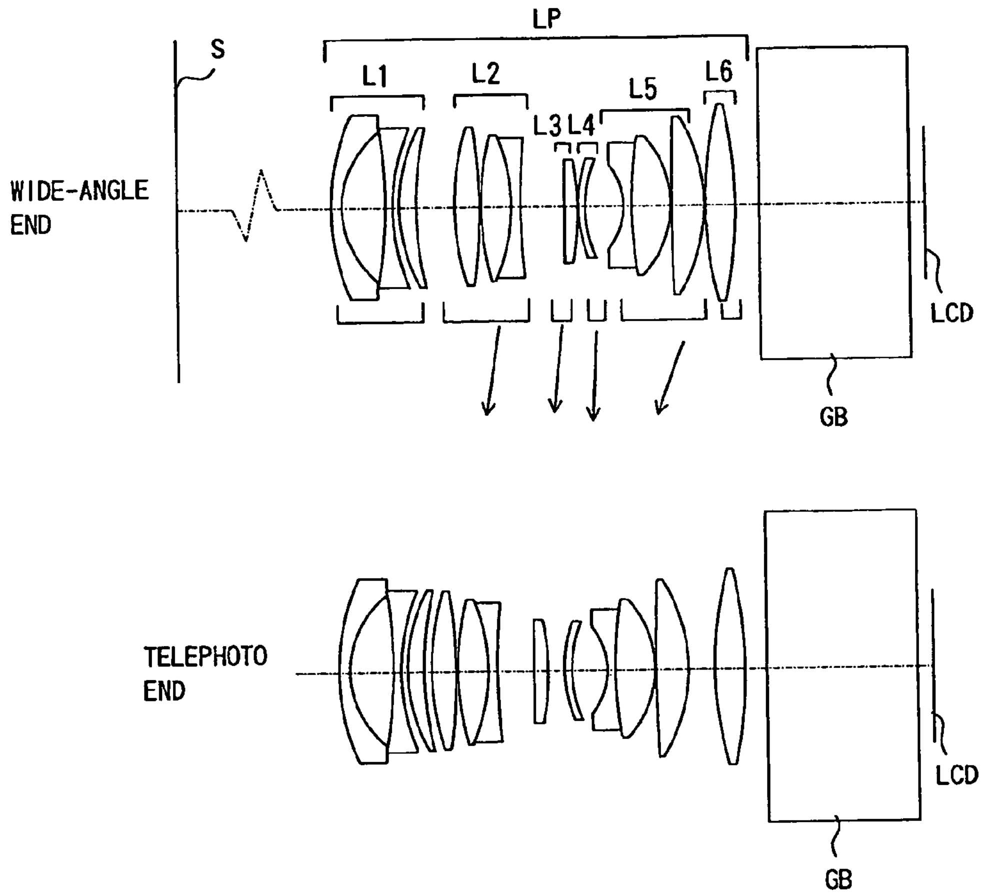
FIG. 1 is a schematic view of main parts of an image projection apparatus using a zoom lens according to Embodiment 1 of the present invention.
Figure 2A:
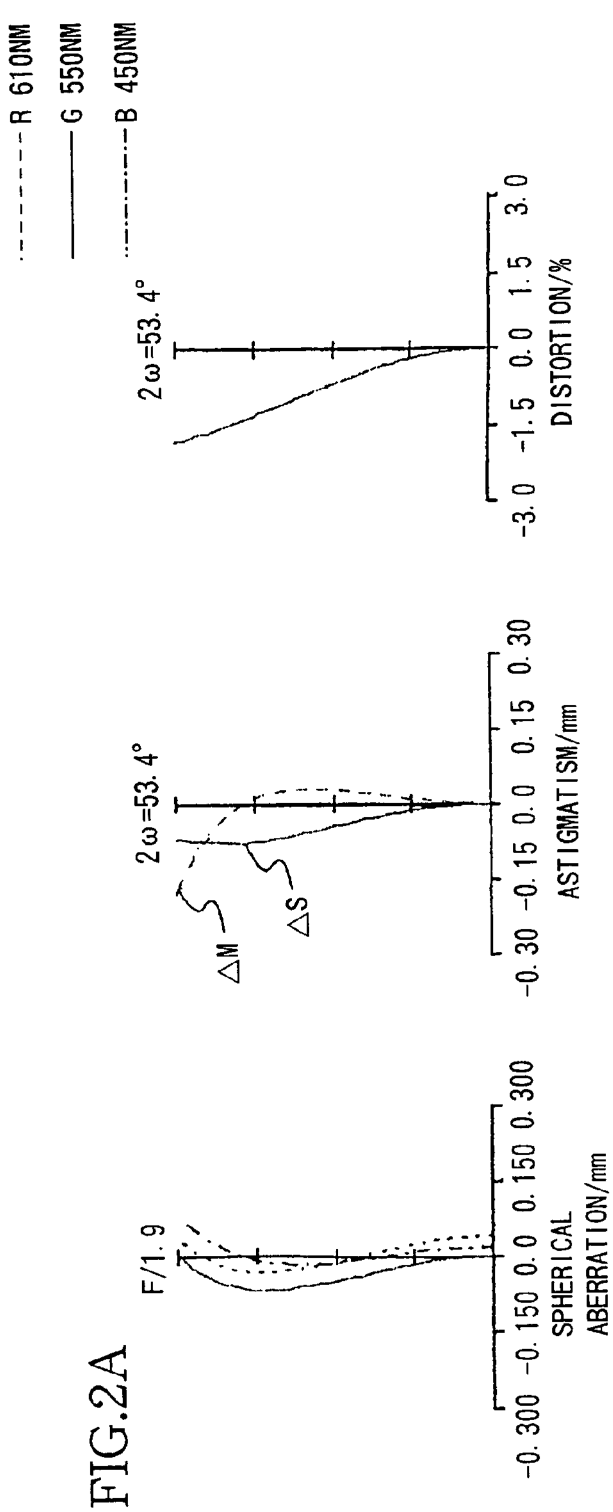
FIG. 2 is an aberration diagram when a zoom lens according to Numerical Example 1 of the present invention is expressed in mm and when the object distance is 2.3 m.
Figure 2B:
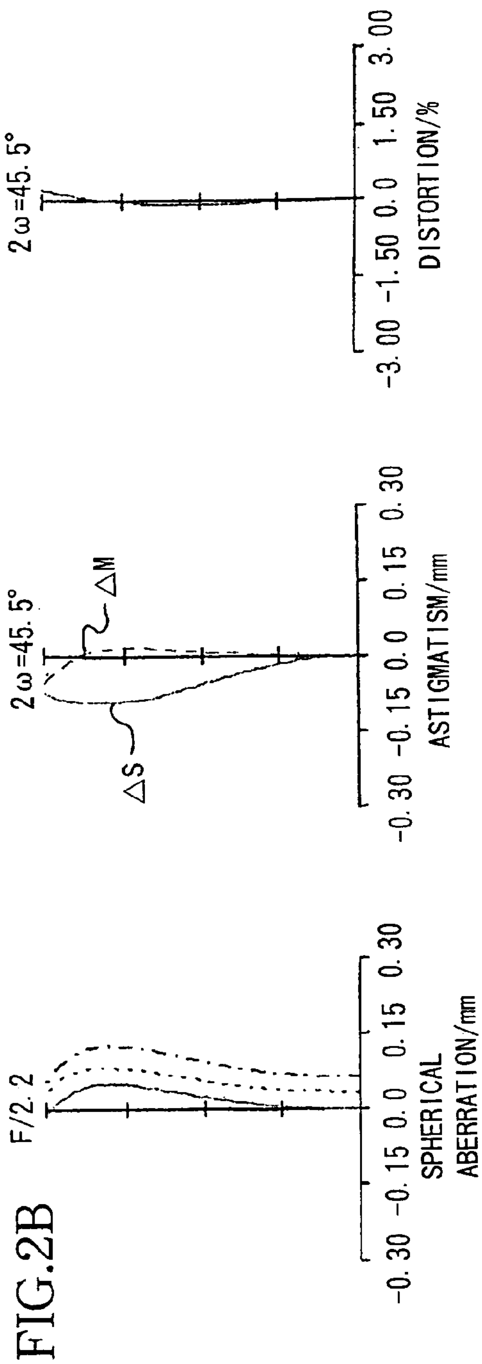

FIG. 1 is a schematic view of main parts of an image projection apparatus (liquid crystal video projector) using a zoom lens according to Embodiment 1 of the present invention. FIGS. 2(A), (B) show aberration diagrams at the wide-angle end (short focal length side) and telephoto end (long focal length side) when values of Numerical Example 1 which will be described later corresponding to Embodiment 1 of the present invention are expressed in mm and when the object distance (distance from the first lens unit) is 2.3 m.

Figure 3:
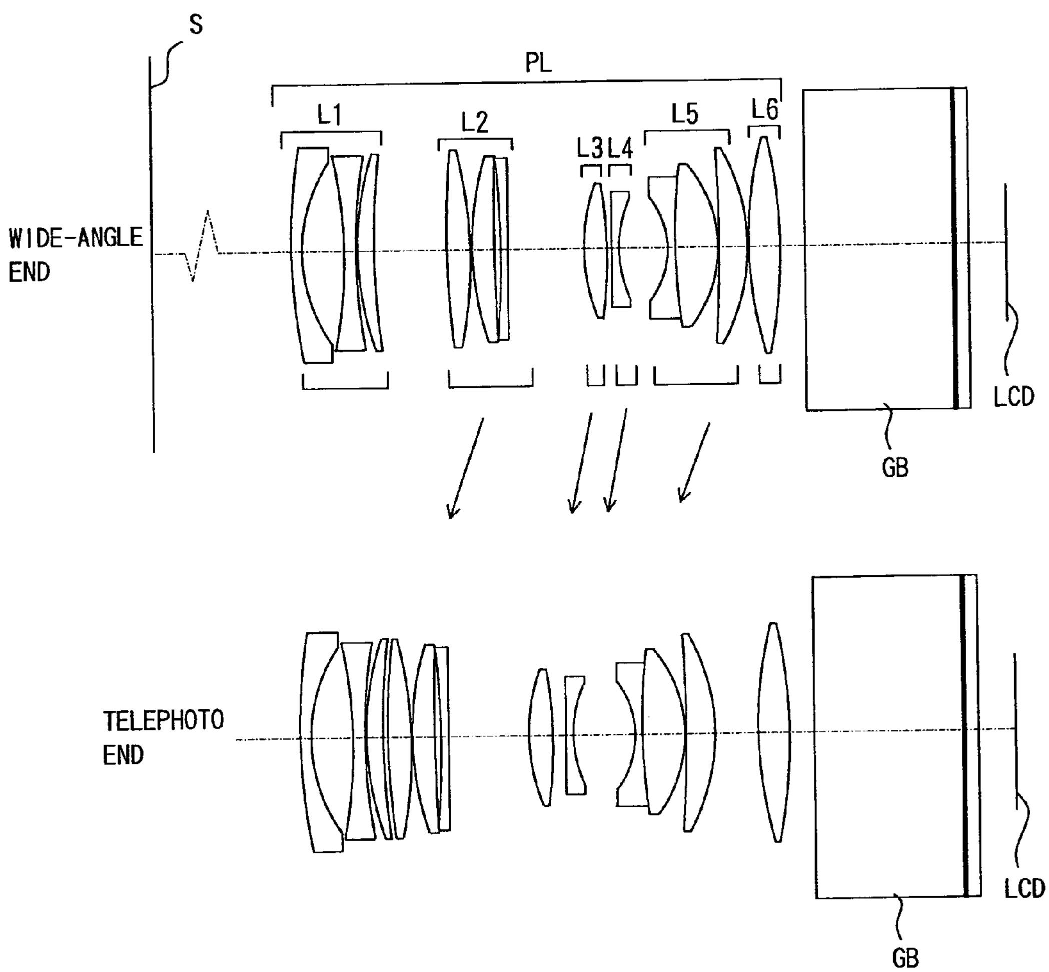
FIG. 3 is a schematic view of main parts of an image projection apparatus using a zoom lens according to Embodiment 2 of the present invention.
Figure 4A:
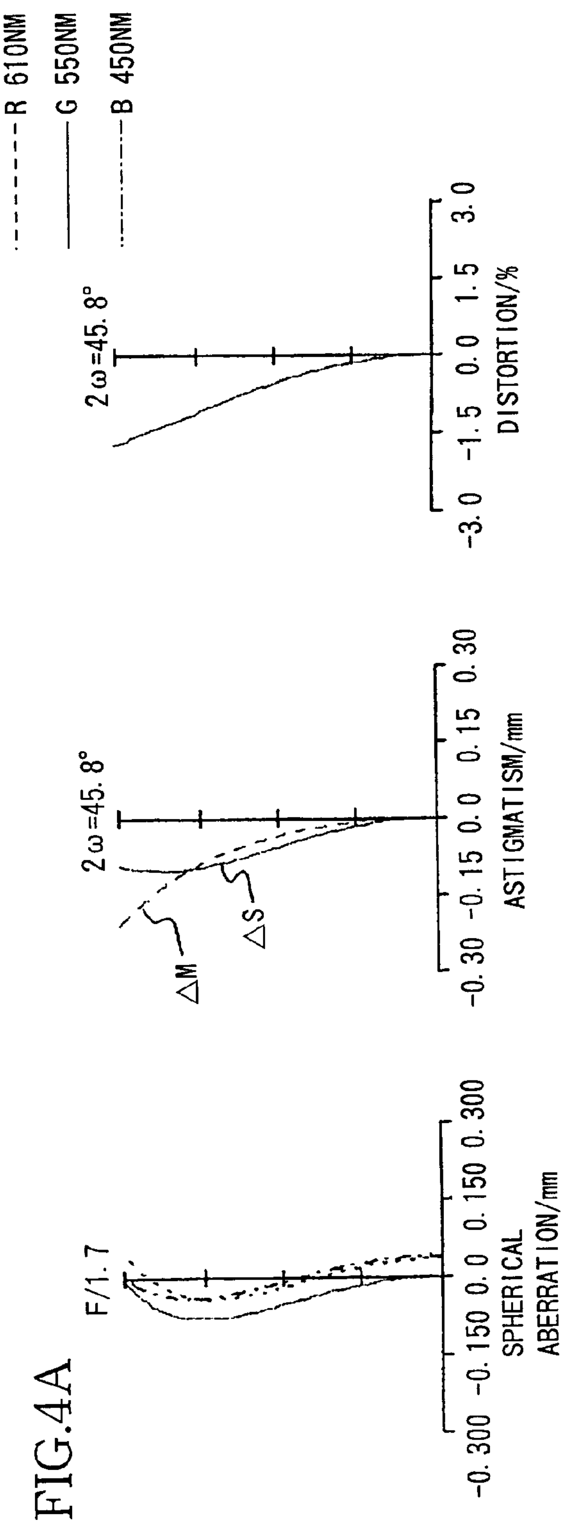
FIG. 4 is an aberration diagram when a zoom lens according to Numerical Example 2 of the present invention is expressed in mm and when the object distance is 2.8 m.
Figure 4B:
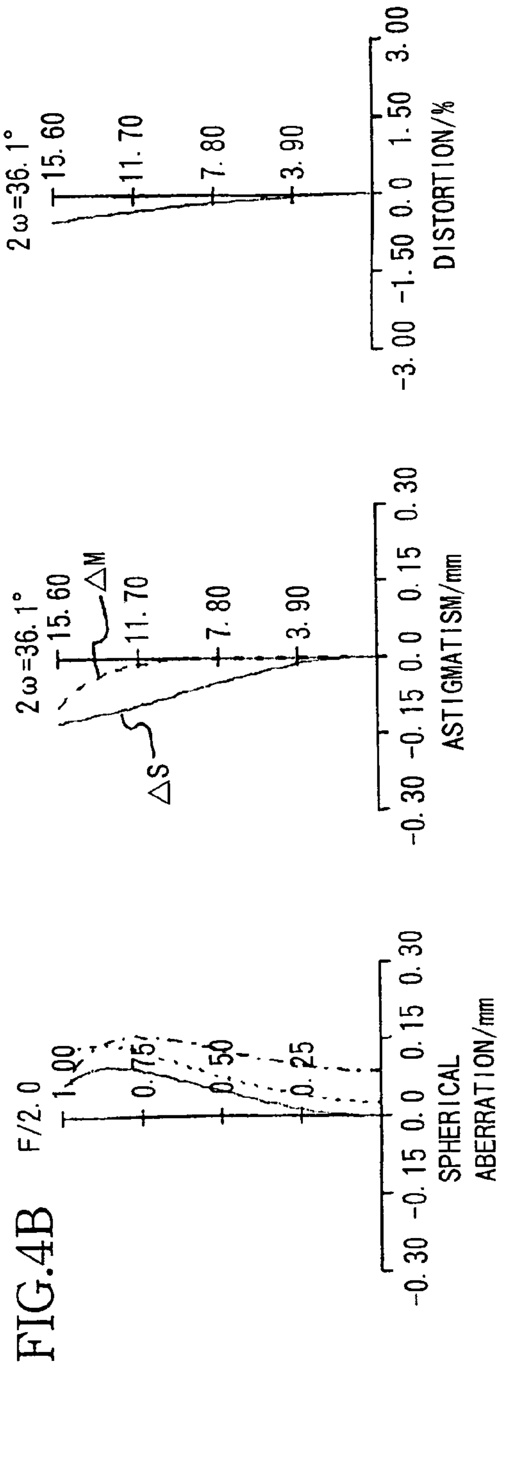

FIG. 3 is a schematic view of main parts of an image projection apparatus (liquid crystal video projector) using a zoom lens according to Embodiment 2 of the present invention. FIGS. 4(A), (B) show aberration diagrams at the wide-angle end (short focal length end) and at the telephoto end (long focal length end) when values of Numerical Example 2 which will be described later corresponding to Embodiment 1 of the present invention are expressed in mm and when the object distance (distance from the first lens unit) is 2.8 m.

Figure 5:
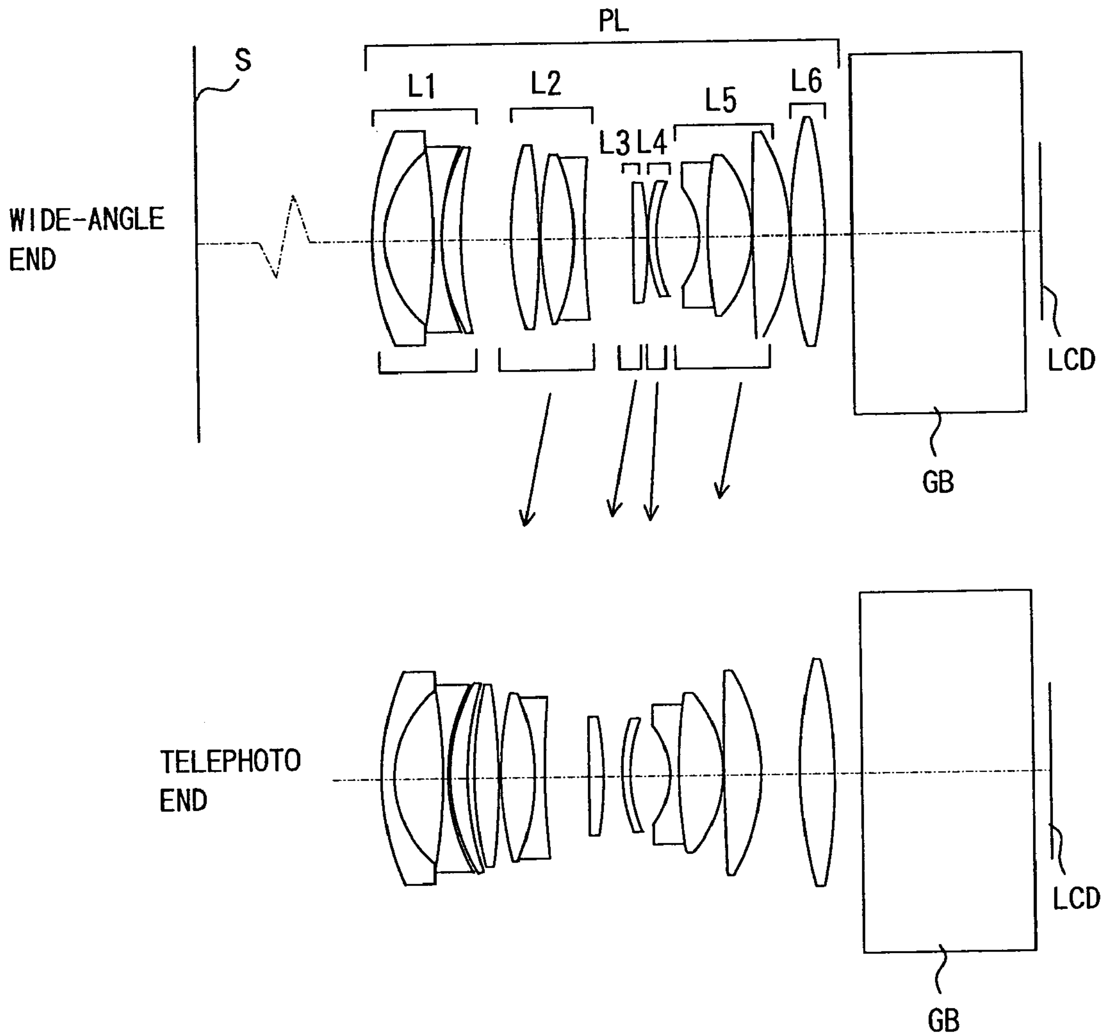
FIG. 5 is a schematic view of main parts of an image projection apparatus using a zoom lens according to Embodiment 3 of the present invention.
Figure 6A:
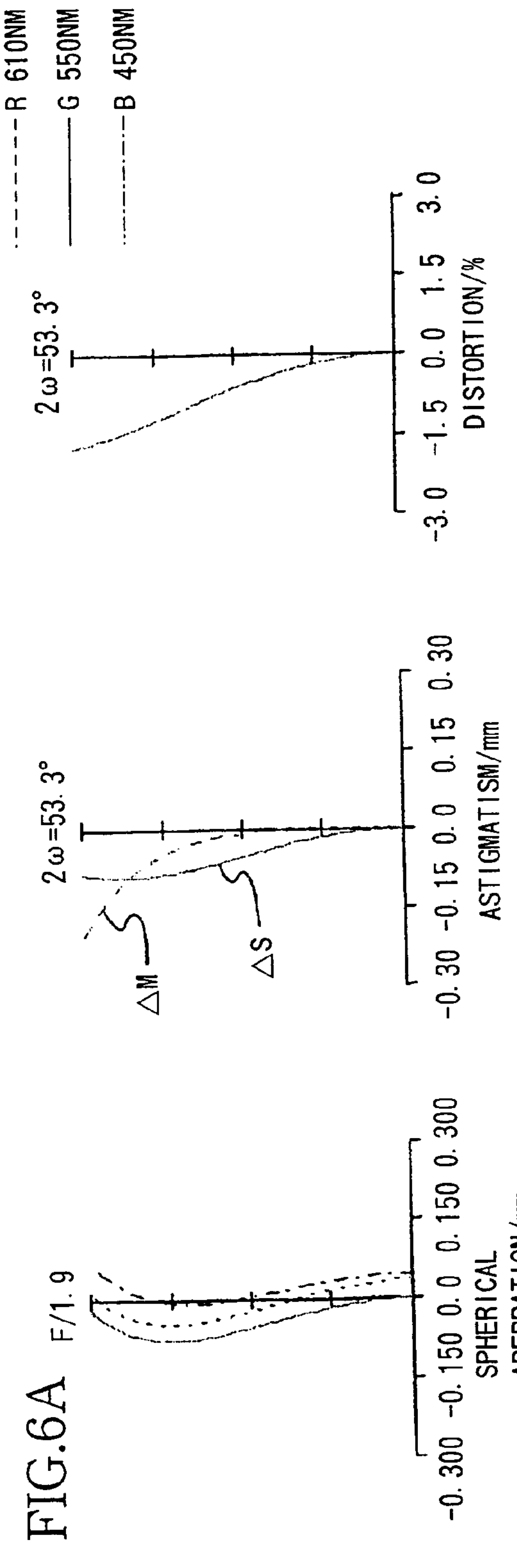
FIG. 6 is an aberration diagram when a zoom lens according to Numerical Example 3 of the present invention is expressed in mm and when the object distance is 2.3 m.
Figure 6B:
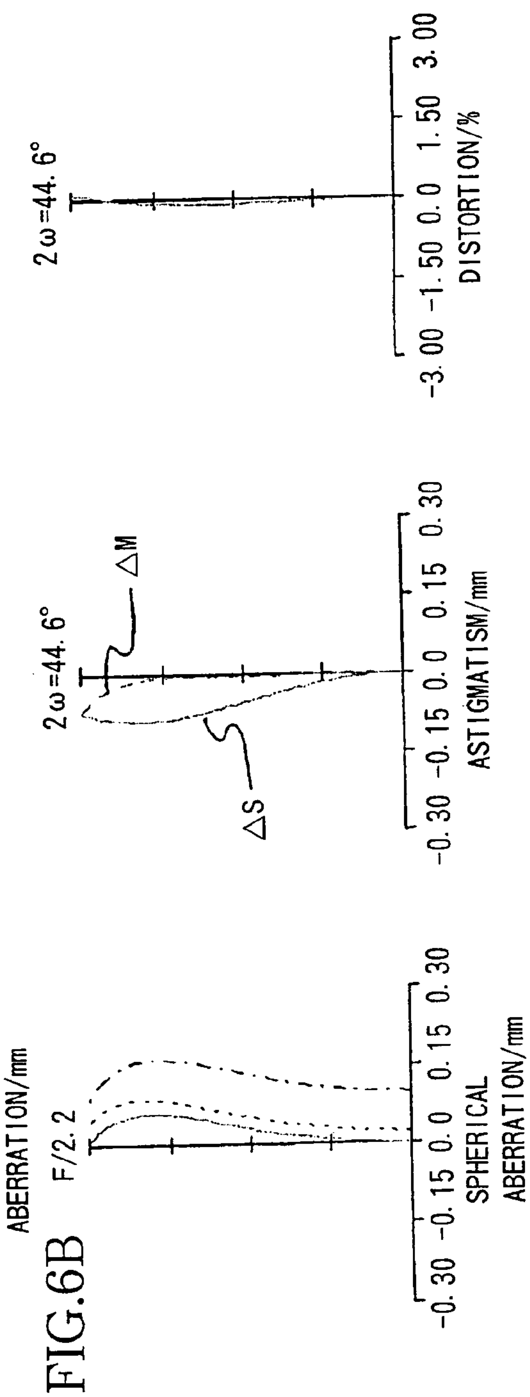

FIG. 5 is a schematic view of main parts of an image projection apparatus (liquid crystal video projector) using a zoom lens according to Embodiment 3 of the present invention. FIGS. 6(A), (B) show aberration diagrams at the wide-angle end (short focal length end) and at the telephoto end (long focal length end) when values of Numerical Example 3 which will be described later corresponding to Embodiment 1 of the present invention are expressed in mm and when the object distance (distance from the first lens unit) is 2.3 m.

Figure 7:
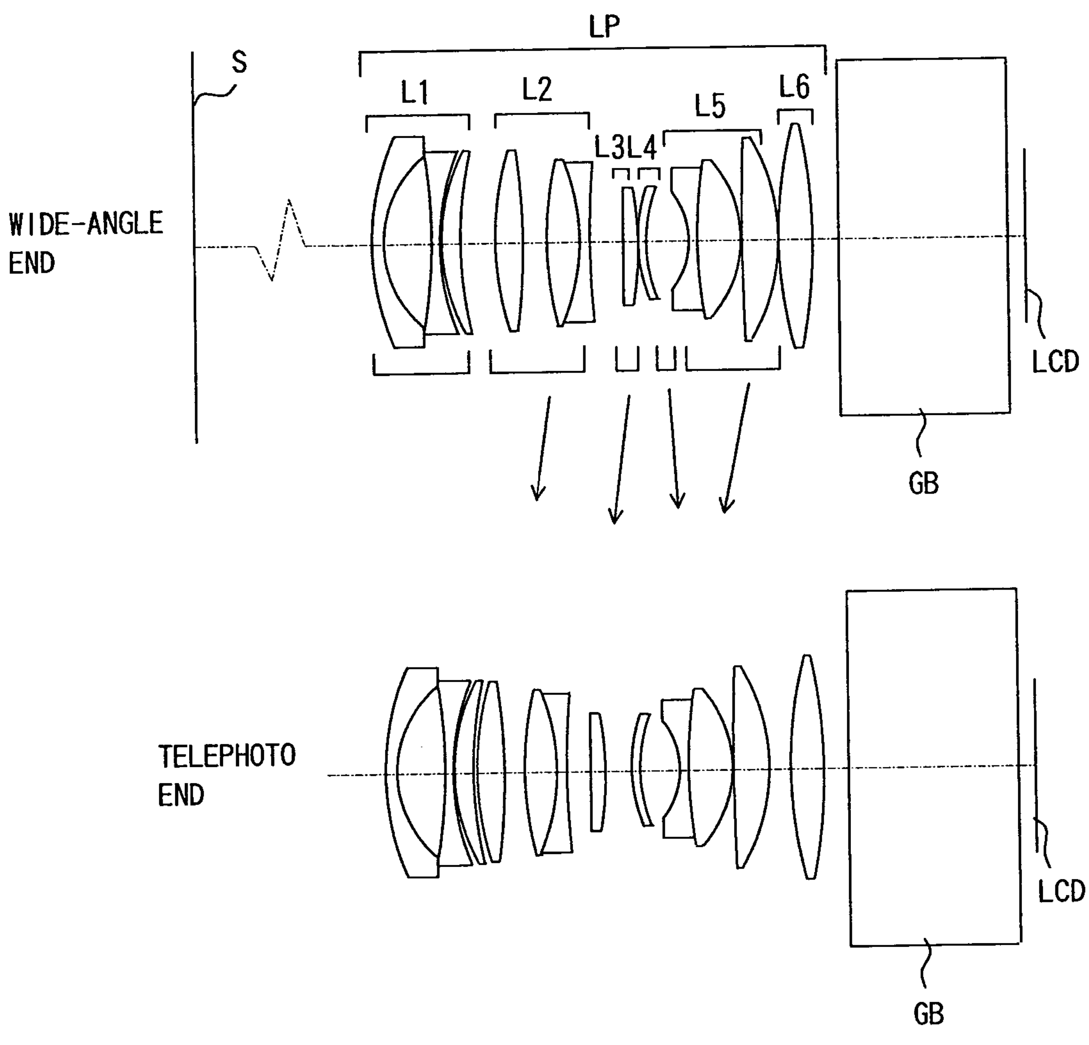
FIG. 7 is a schematic view of main parts of an image projection apparatus using a zoom lens according to Embodiment 4 of the present invention.
Figure 8A:
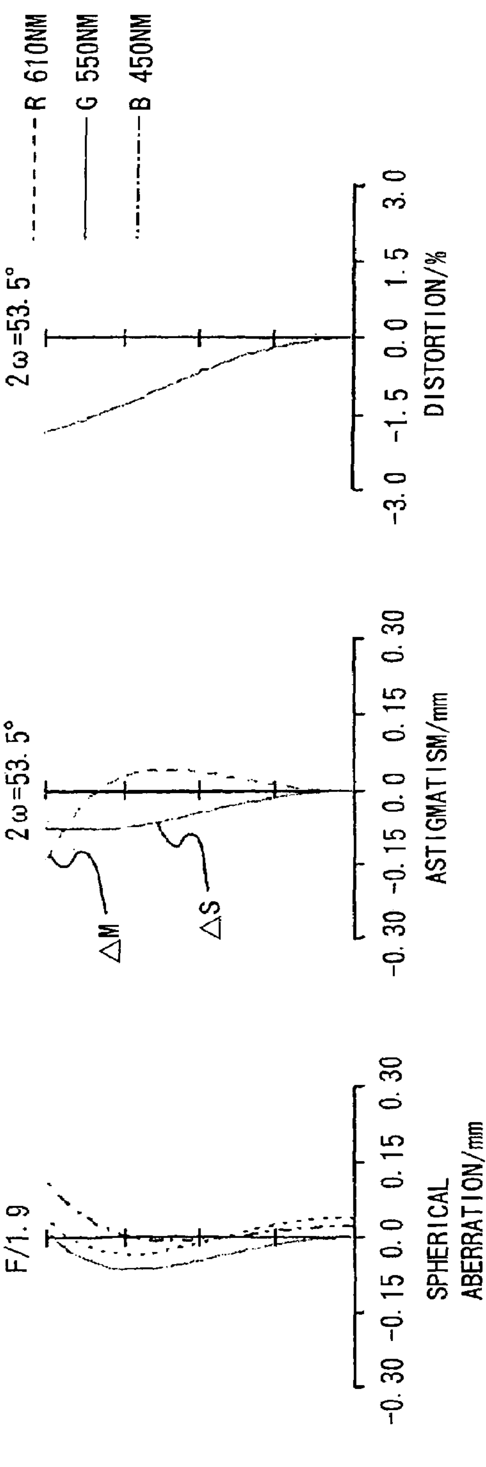
FIG. 8 is an aberration diagram when a zoom lens according to Numerical Example 4 of the present invention is expressed in mm and when the object distance is 2.3 m.
Figure 8B:
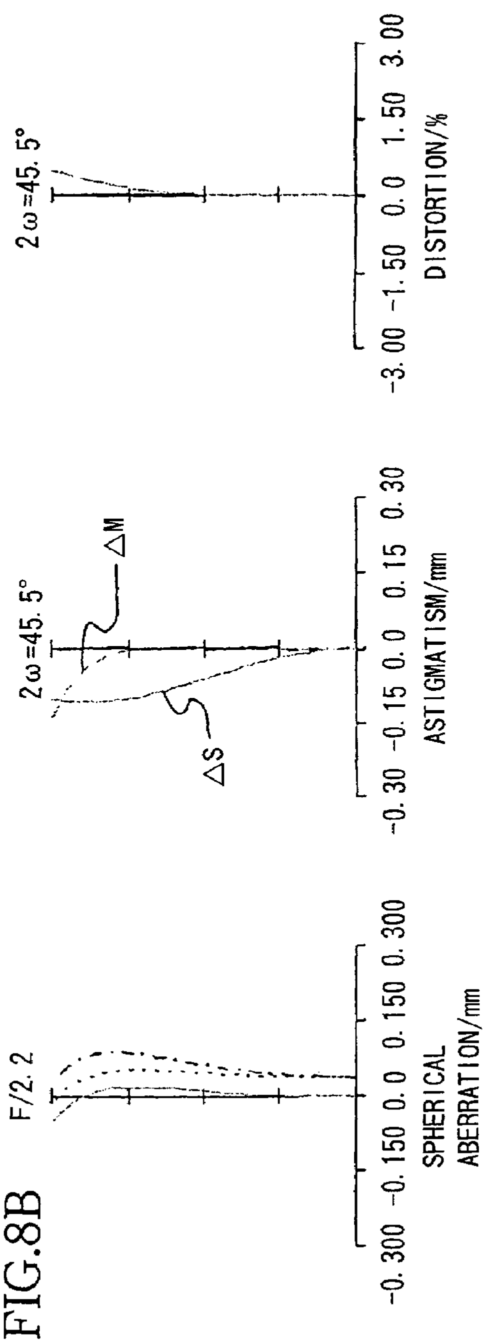

FIG. 7 is a schematic view of main parts of an image projection apparatus (liquid crystal video projector) using a zoom lens according to Embodiment 4 of the present invention. FIGS. 8(A), (B) show aberration diagrams at the wide-angle end (short focal length end) and at the telephoto end (long focal length end when values of Numerical Example 4 which will be described later corresponding to Embodiment 1 of the present invention are expressed in mm and when the object distance (distance from the first lens unit) is 2.3 m.

Figure 9:
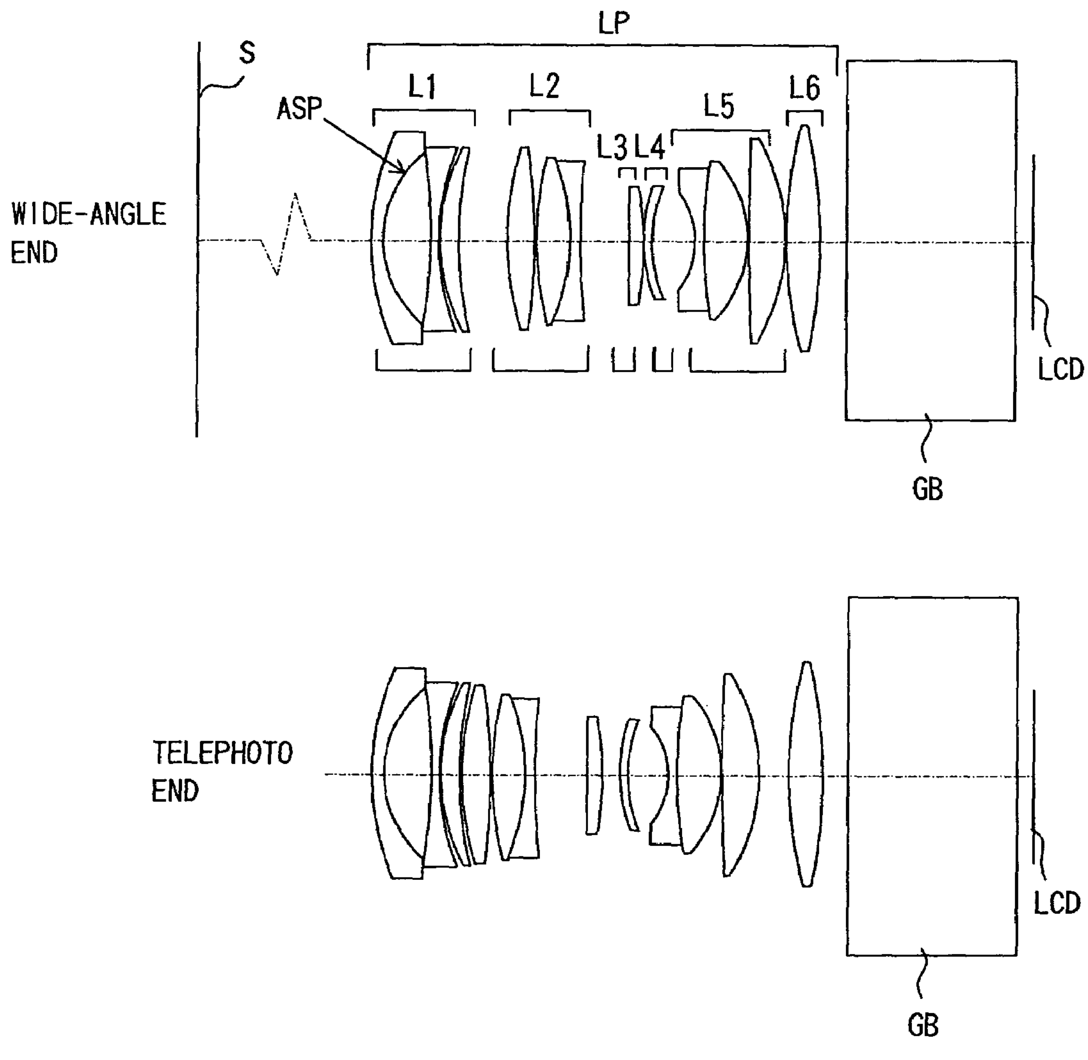
FIG. 9 is a schematic view of main parts of an image projection apparatus using a zoom lens according to Embodiment 5 of the present invention.
Figure 10A:
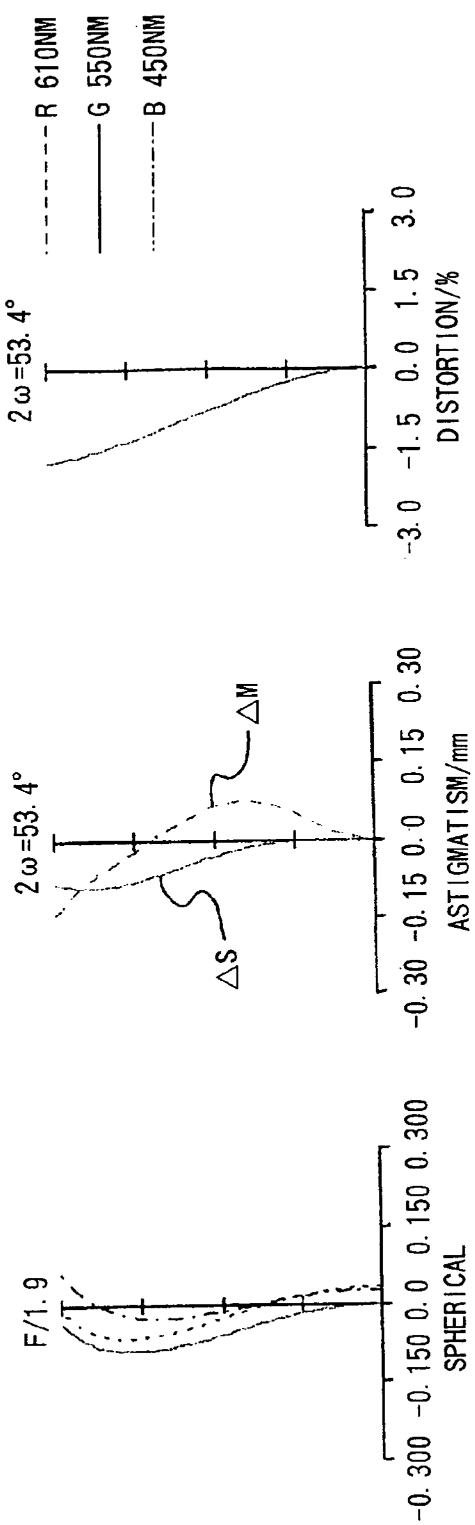
FIG. 10 is an aberration diagram when a zoom lens according to Numerical Example 5 of the present invention is expressed in mm and when the object distance is 2.1 m.
Figure 10B:
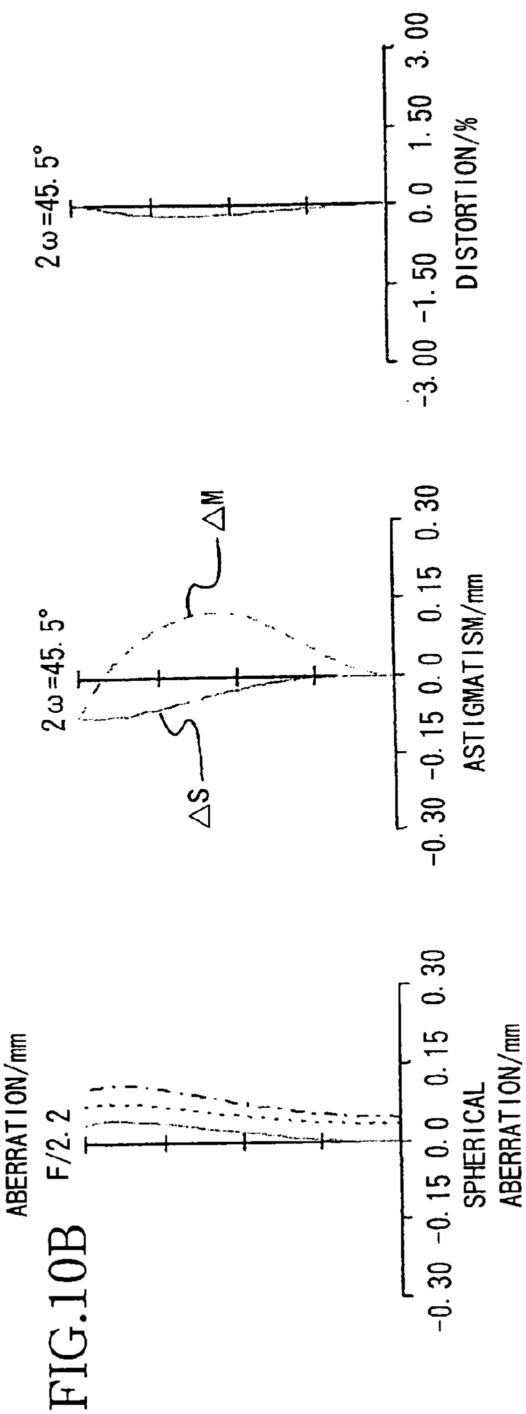

FIG. 9 is a schematic view of main parts of an image projection apparatus (liquid crystal video projector) using a zoom lens according to Embodiment 5 of the present invention. FIGS. 10(A), (B) show aberration diagrams at the wide-angle end (short focal length end) and at the telephoto end (long focal length end) when values of Numerical Example 5 which will be described later corresponding to Embodiment 1 of the present invention are expressed in mm and when the object distance (distance from the first lens unit) is 2.1 m.

In the image projection apparatuses according to Embodiments 1 to 5 shown in FIG. 1, FIG. 3, FIG. 5, FIG. 7 and FIG. 9, an original image (projected image) of an LCD is enlarged and projected by a zoom lens (projection lens) PL onto a screen surface S.

Reference character S denotes a screen surface (projection surface) and LCD denotes an original image (projected image) of a liquid crystal panel (liquid crystal display element), etc. The screen surface S and the original image LCD have a conjugate relationship, and the screen surface S generally corresponds to the magnifying side (front side) at a conjugate point (first conjugate point) with a longer distance and the original image LCD corresponds to the demagnifying side (rear side) at a conjugate point (second conjugate point) with a shorter distance. When a zoom lens is used as an image-taking system, the screen surface S side corresponds to the object side and the original image LCD side corresponds to the image-pickup surface.

Reference character GB denotes a glass block such as a color combining prism, polarization filter or color filter, etc.

The zoom lens PL is mounted in the body of a liquid crystal video projector (not shown) through a connection member (not shown). The liquid crystal display element LCD side from the glass block GB onward is included in the body of the projector.

Reference character L1 denotes a first lens unit having a negative refractive power, L2 denotes a second lens unit having a positive refractive power, L3 denotes a third lens unit having a positive refractive power, L4 denotes a fourth lens unit having a negative refractive power, L5 denotes a fifth lens unit having a positive or negative refractive power and L6 denotes a sixth lens unit having a positive refractive power.

In each embodiment, during zooming (variable magnification) from the wide-angle end to the telephoto end, the second lens unit L2, third lens unit L3, fourth lens unit L4 and fifth lens unit L5 are independently moved toward the first conjugate point side (screen S side) which is the magnifying side as indicated by arrows. For zooming, the first lens unit L1 and sixth lens unit L6 are fixed. Furthermore, the first lens unit L1 is moved on the optical axis to achieve focusing. Here, focusing can also be achieved by moving the display panel LCD.

A stop is provided between the fourth lens unit L4 and the fifth lens unit L5. The surface of each lens is provided with a multiplayer coat for reflection prevention.

In the aberration diagrams in FIG. 2, FIG. 4, FIG. 6, FIG. 8 and FIG. 10, reference character G denotes aberration at a wavelength of 550 nm, R denotes aberration at a wavelength of 610 nm, B denotes aberration at a wavelength of 450 nm and both S (inclination of sagittal image surface) and M (inclination of meridional image surface) denote aberration at a wavelength of 550 nm. Reference character F denotes an F number. ω denotes a half field angle.

Then, features of the zoom lens of each embodiment will be explained.

The following conditional expressions are satisfied:

when $\nu d=(nd-1)/(nF-nC)$ and $\theta gF=(ng-nF)/(nF-nC)$ are assumed, $$0.00<o1/L1<0.38 \quad (1)$$

$$-0.015<\theta gF-(0.6438-0.001682\nu d)<0.04 \quad (2)$$

where o1 represents a distance from a surface vertex on the most magnifying (front) side of the first lens unit to a position of a principal plane on the magnifying (front) side, L1 represents an overall length of the first lens unit, the sixth lens unit L6 includes at lest one positive lens, νd represents an average Abbe number of a material of the at least one positive lens, θgF represents an average partial dispersion ratio (when the sixth lens unit L6 consists of one positive lens, νd represents an average Abbe number of the material of the positive lens and θgF represents a partial dispersion ratio), ng, nd, nF, nC represent refractive indices of materials with g-, d-, F-, C-lines.

Use of a negative lead type zoom lens structure headed by a lens unit having a negative refractive power exploits the feature of securing a wider field angle and longer back focus. On the other hand, to cope with the difficulty in achieving a high degree of variable magnification, four movable components (four lens units) are adopted for zooming to thereby realize a compact optical system. Conditional expression (1) determines related to the position of the principal plane of the first lens unit L1. Falling short of the lower limit of condition (1) produces merits such as the ability to design the entire optical system such as the overall lens length to be more compact, but makes correction of off-axis aberration such as distortion more difficult. On the contrary, exceeding the upper limit is effective in the aspect of aberration correction, but is undesirable because both the diameter of the front lens unit and the overall lens length increase. Condition (2) determines a difference between a specific partial dispersion ratio (θgF) and normal-line (standard glass material line connecting K7-F2) value calculated from the Abbe number with regard to the material of the positive lens making up the sixth lens unit L6 and expresses a characteristic of so-called anomalous dispersion. Falling short of the lower limit of condition (2) makes correction of chromatic aberration of magnification particularly on the short wavelength (blue-violet) side more difficult. As the glass material satisfying condition (2), for example, a material manufactured by O'hara Corporation, Ba (barium), Ti (titanium) based flint having a high refractive index can be used.

The fifth lens unit L5 and sixth lens unit L6 each have one or more positive lenses, and when an average refractive index of the one or more positive lens materials is assumed to be N56P, the following condition is satisfied:

$$1.62<N56p<1.85 \quad (3)$$

Condition (3) mainly determines the conditions of refractive indices about the material of positive lenses arranged from the stop to the demagnifying conjugate side. When a retro-focus type is used, the arrangement of refractive powers becomes asymmetrical, which often provokes inward-coma and distortion. Condition (3) is provided capably to correct aberration at this time. Selecting a glass material satisfying condition (3) for the material of positive lenses arranged on the demagnifying conjugate side such as the fifth, sixth lens units L5, L6 corrects inward-coma and distortion satisfactorily and also prevents deterioration of Petzval's condition.

The first and sixth lens units L1, L6 are both fixed with respect to the demagnifying conjugate plane during zooming and the overall lens length is made invariable over the entire zoom range. This lens arrangement secures robustness of the projection lens, and since the first lens unit L1 having a large diameter is fixed during zooming, there is little variation in weight balance, etc., and it is advantageous in the mechanical aspect.

In each embodiment, it is the second lens unit L2 and fourth lens unit L4 that mainly assume the function of variable magnification. Thus, when it is assumed that the image formation magnification of a combined lens unit of the second lens unit L2 and third lens unit L3 at the wide-angle end is β23w, the following condition is satisfied:

$$0.1<-\beta 23w<1.0 \quad (4)$$

Condition (4) shows that the combined lens unit of the second lens unit L2 and third lens unit L3 is used at the same or smaller image formation magnification and falling short of the lower limit causes the overall lens length to increase, etc., preventing downsizing of the overall optical system. On the contrary, exceeding the upper limit provides a structure which is advantageous for downsizing of the overall optical system, but tends to increase variation in aberration during zooming, which is not desirable.

When the image formation magnification of the fourth lens unit L4 at the wide-angle end is assumed to be β4w, the following condition is satisfied:

$$1<\beta 4w<5 \quad (5)$$

Condition (5) determines the image formation magnification of the fourth lens unit L4. Falling short of the lower limit causes the refractive power of the fourth lens unit L4 to become smaller and Petzval's condition to deteriorate, increasing the curvature of the image surface or failing to secure a desired back focus. Furthermore, problems in the mechanical aspect also occur, for example, the variation in aberration increases due to an increase in the amount of movement during zooming, distance between lens units is reduced. On the contrary, exceeding the upper limit causes the negative refractive power to increase excessively, producing a back focus space more than necessary, which is undesirable.

As described above, since the fourth lens unit L4 operates with a magnifying power, moving the fourth lens unit L4 from the demagnifying conjugate side to the magnifying conjugate side during zooming results in a magnifying action. This magnifying action causes the in-focus surface to shift in a direction of longer length during zooming from the wide-angle end to the telephoto end, which is corrected by the third lens unit L3 which operates with a demagnifying power moving toward the magnifying conjugate side. The fifth lens unit L5 moves toward the same magnifying conjugate side as the third lens unit L3 to repressed aberration and variation of the pupil during zooming by the stop which exists in the third lens unit L3 moving toward the magnifying conjugate side. Therefore, all the second to fifth lens units move toward the magnifying conjugate side during zooming from the wide-angle end to the telephoto end.

Furthermore, to reduce harmful effects such as deterioration of various types of aberration produced when the projection system is provided with high functions, at least one aspherical lens is used inside the projection lens PL. For the aspherical surface, one produced by glass molding or hybrid aspherical surface produced by molding thin resin, etc. can be selected. Depending on the target resolution or sensitivity of the aspherical surface, a plastic-molded aspherical lens may also be used. Though it depends on the aberration to be removed, it is effective to use aspherical surfaces for surfaces as far as possible from the stop surface such as the first lens unit L1, fifth lens unit L5 or sixth lens unit L6 in order to mainly correct various types of off-axis aberration satisfactorily.

The fifth lens unit L5 is constructed of one negative lens whose both lens surfaces are concave and two or more positive lenses in order from the magnifying side (front side). This is intended to arrange a lens having a strong negative refractive power at a position at which the height of light rays on the optical axis is reduced to a minimum, which efficiently reduces Petzval's sum. Furthermore, since positive lenses need to cause light rays raised by the negative lens arranged on the demagnifying conjugate side from the stop to gently curve and have good telecentric performance, at least two positive lenses are used. Furthermore, the positive lenses are preferably concentric shape toward the stop surface for the purpose of suppressing astigmatism and a material with a high refractive index is used as the glass material as described in condition (3).

The following condition is satisfied:

$$1.2<f6/fw<3.0 \quad (6)$$

where fw is a focal length of the entire system at the wide-angle end and f6 is a focal length of the sixth lens unit L6.

Note that the wide-angle end and telephoto end refer to the zoom positions when a variable magnification lens unit is positioned at either end of the range within which the lens unit can mechanically move in the direction of the optical axis.

The sixth lens unit L6 adding close to the image surface has the function of lessening the combined refractive power of the first to fifth lens units L1 to L5, which is an action advantageous for widening the field angle and increasing the diameter. Falling short of the lower limit of condition (6) causes the refractive power of the sixth lens unit L6 to increase excessively, increasing distortion and inward-coma flare. On the contrary, exceeding the upper limit causes the refractive power of the sixth lens unit L6 to decrease excessively, reducing the effect of lessening the refractive powers of the first to fifth lens units L1 to L5 and lessening the effect of high performance, which is undesirable. Furthermore, with regard to the glass material, it is preferable to use a material with the highest possible refractive index as in the case of the positive lens of the fifth lens unit L5.

When an average refractive index (when only one lens is used, the refractive index of the material of that lens) of the material of one or more positive lenses making up the sixth lens unit L6 is assumed to be N6p, the following condition is satisfied:

$$1.70<N6p<1.85 \quad (7)$$

Falling short of the lower limit of condition (7) mainly causes distortion or deterioration of inward-coma, etc., which is undesirable.

Furthermore, the focusing mechanism according to the projection distance on the magnifying side is assumed by the first lens unit L1, realizing an optical system with the simplest structure.

Note that it is preferable to set the numerical ranges of conditions (1) to (7) to correct aberration and reduce the size of the entire apparatus as follows:

$$0.1<o1/L1<0.33 \quad (1a)$$

$$-0.01<\theta gF-(0.6438-0.001682\nu d)<0.03 \quad (2a)$$

$$1.65<N56p<1.8 \quad (3a)$$

$$0.2<-\beta 23w<0.8 \quad (4a)$$

$$1.4<\beta 4w<4.5 \quad (5a)$$

$$1.4<f6/fw<2.5 \quad (6a)$$

$$1.72<N6p<1.84 \quad (7a)$$

Then, more specific features of each embodiment will be explained below.

According to Embodiment 1 in FIG. 1, the first lens unit L1 consists of three lenses; negative lens, negative lens and positive lens in order from the magnifying conjugate side, and a principal plane is arranged close to the magnifying conjugate side. This facilitates downsizing of the overall lens length. Furthermore, adopting a negative lens for the lens on the most magnifying conjugate side allows the apparent position of the pupil to be arranged closer to the demagnifying conjugate side facilitating a reduction of the diameter of a front lens unit.

The second lens unit L2 serves as the principal lens unit for variable magnification and is given a large refractive power. Thus, a glass material having a high refractive index is used for the positive lens to reduce Petzval's sum and variations in aberration such as spherical aberration during zooming. When high response at a high spatial frequency is required for a zoom lens of a large aperture ratio, the allowable deranged diameter is reduced and the focal depth shallows, and therefore the level of resolution deteriorates drastically when the curvature of the image surface and astigmatism are large at a medium height of the image, etc. For this reason, each embodiment structures the second lens unit L2 as shown above to reduce Petzval's sum.

From this aspect and the aspect of correcting chromatic aberration of magnification in a wideband of the visible light region sufficiently, La (lanthanum) based heavy flint material is used for the positive lens.

The fourth lens unit L4 serves to complement the variable magnification ratio that cannot be secured by the second lens unit L2, and is a so-called sub-variable magnification lens unit. The fourth lens unit L4 consists of one negative lens, and the image formation magnification of the fourth lens unit L4 is equal or greater magnification with respect to the entire variable magnification region and the fourth lens unit L4 moves toward the magnifying conjugate side in the same way as for the second and third lens units L2, L3 during zooming from the wide-angle end to the telephoto end.

The fifth lens unit L5 gives a strong negative refractive power toward the magnifying conjugate side. By this strong negative refractive power, Petzval's sum is set Small. Furthermore, the principal plane is arranged on the demagnifying conjugate side to secure high telecentric performance and sufficiently long back focus.

The sixth lens unit L6 consists of one positive lens whose both lens surfaces are convex. Giving an appropriate (according to condition (6)) refractive power to the sixth lens unit L6 lessens the combined refractive power of the first to fifth lens units L1 to L5, providing an action advantageous for widening the field angle and increasing the aperture ratio. Since it is located far from the stop surface, the sixth lens unit L6 affects off-axis aberration such as distortion. For this reason, a Ti (titanium) based heavy flint material having a high refractive index Nd of 1.81 is used as the positive lens material. According to condition (2), this heavy flint material has a high degree of anomalous dispersion (which refracts a large amount of short-wavelength light) of 0.015 and has the effect of effectively correcting chromatic aberration of magnification on the short wavelength (blue-violet) side related to a peripheral region of a screen whose correction is normally difficult. Furthermore, since it has a high refractive index of 1.81 as described above, the heavy flint material also acts advantageously in the aspect of aberration correction such as distortion and inward-coma and Petzval's condition.

Embodiments 2 to 5 below will describe mainly structures different from that of Embodiment 1.

According to Embodiment 2 in FIG. 3, the first lens unit L1 consists of three lenses; negative lens, negative lens, positive lens in order from the magnifying side and FSL5 (trade name) manufactured by O'hara Corporation is used for the second negative lens to effectively correct chromatic aberration of magnification, etc. In Embodiment 2, it is also possible to use a glass material having high anomalous dispersion properties such as FPL51 (trade name) manufactured by O'hara Corporation for further improvement of chromatic aberration of magnification.

The sixth lens unit L6 consists of a single positive lens whose both lens surfaces are convex and a Ti (titanium) based heavy flint material having a high refractive index Nd of 1.76 is used for that material. According to condition (2), this heavy flint material also has a relatively high degree of anomalous dispersion (can refract a large amount of short wavelength light) of 0.014, and especially has the effect of effectively correcting chromatic aberration of magnification on the short wavelength side related to the peripheral region of the image whose correction is normally difficult. Other aspects are substantially the same as those of Embodiment 1.

According to Embodiment 3 in FIG. 5, the sixth lens unit L6 consists of a single positive lens whose both lens surfaces are convex. Unlike Embodiments 1, 2, a La (lanthanum) based heavy flint material is used as the material for the positive lens. The value in condition (2) is a negative value of −0.004. For this reason, this material behaves in a manner opposite to the Ti(titanium) based heavy flint material shown in Embodiments 1, 2, and therefore it is undesirable from the aspect of correcting chromatic aberration of magnification on the short wavelength (blue-violet) side, but since the average refractive index N56p of the positive lens material making up the fifth and sixth lens units L5, L6 shown in condition (3) is as high as 1.76, this material acts advantageously in the aspect of aberration correction such as distortion and inward-coma. Other aspects are substantially the same as Embodiment 1.

According to Embodiment 4 in FIG. 7, the fifth lens unit L5 has a weak negative refractive power. As described above, a negative lens having a strong refractive power is preferably arranged on the most magnifying conjugate side of the fifth lens unit L5, and the fifth lens unit L5 is particularly constructed of a negative refractive power to efficiently correct Petzval's sum. Other aspects are substantially the same as Embodiment 1.

Embodiment 5 in FIG. 9 adopts an aspherical surface for the surface on the demagnifying conjugate side of the negative lens on the most magnifying conjugate side of the first lens unit L1 to efficiently correct various types of off-axis aberration such as distortion. Embodiment 5 further widens the field angle in Embodiment 3 using the aspherical surface. Other aspects are substantially the same as Embodiment 3.

Figure 11:
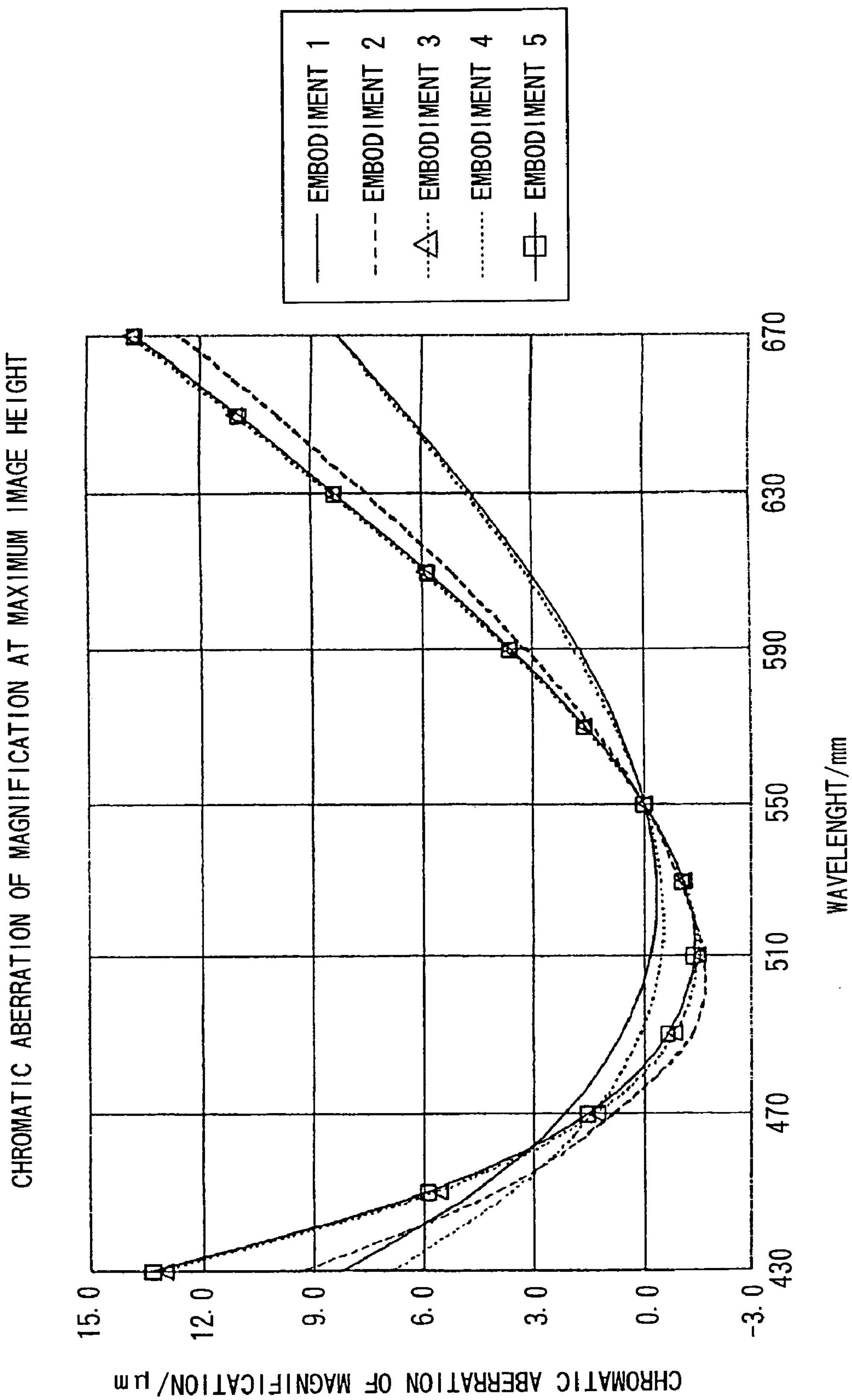
FIG. 11 illustrates chromatic aberration of magnification at the maximum image height according to Numerical Examples 1 to 5 of the present invention.

The characteristics of chromatic aberration of magnification at the maximum image height in the respective embodiments are shown in FIG. 11. The horizontal axis shows wavelengths and the vertical axis shows values of chromatic aberration of magnification at the maximum image height and all principal wavelengths are 550 nm. Though it cannot be generalized because this is a comparison among embodiments with different structures, but it can be appreciated from this figure that the magnitude of values in condition (2) has a not small effect on the secondary spectral component of chromatic aberration of magnification.

The following are Numerical Examples 1 to 5 corresponding to the zoom lenses of Embodiments 1 to 5. In each Numerical Example, reference character i denotes an order of optical surfaces from the magnifying side (front side), ri denotes a radius of curvature of the ith optical surface (the ith surface), di denotes a distance between the ith surface and the (i+1)th surface, ni and νi denote a refractive index and Abbe number of the material of the ith optical member with respect to a d-line, respectively. Reference character f denotes a focal length and FNO denotes an F number. ω denotes a half field angle.

θgfi denotes a partial dispersion ratio of a material making up the ith surface.

Furthermore, the two surfaces on the most demagnifying side of Numerical Examples 1, 3, 4 and 5 and eight surfaces on the most demagnifying side of Numerical Example 2 are surfaces making up a glass block GB corresponding to a color separation prism, phase plate and various types of filter, etc.

Furthermore, the aspherical shape can be expressed by the following expression:

$$x=(h^2/r)/[1+[1-(1+k)(h/R)2]^{1/2}]+Ah^4+Bh^6+Ch^8+Dh^{10}$$

where k represents eccentricity ratio, A, B, C and D represent aspherical coefficients, x represents displacement in the direction of the optical axis at the position of height h from the optical axis relative to the surface vertex, and r represents a radius of curvature.

Here, for example, notation "e−Z" means "$\times10^{-Z}$".

The relationship between the respective conditions 1 to 7 and values in Numerical Examples 1 to 5 is shown in Table 1.

Numerical Example 1 f: 30.8~36.9 FNO: 1.90~2.19 ω: 26.72~22.76

| | ri | di | Ni | vi | $\theta_{gfi}$ |
|---|---|---|---|---|---|
| 1 | 48.958 | 1.80 | 1.524 | 59.8 | 0.5440 |
| 2 | 20.000 | 8.58 | | | |
| 3 | −84.682 | 1.55 | 1.518 | 64.1 | 0.5353 |
| 4 | 35.330 | 1.28 | | | |
| 5 | 34.049 | 3.30 | 1.839 | 37.2 | 0.5776 |
| 6 | 70.917 | (Variable) | | | |
| 7 | 52.275 | 5.08 | 1.839 | 37.2 | 0.5776 |
| 8 | −123.814 | 0.15 | | | |
| 9 | 46.987 | 6.62 | 1.839 | 37.2 | 0.5776 |
| 10 | −34.604 | 1.35 | 1.854 | 23.8 | 0.6204 |
| 11 | 142.365 | (Variable) | | | |
| 12 | 414.262 | 2.61 | 1.489 | 70.2 | 0.5300 |
| 13 | −67.740 | (Variable) | | | |
| 14 | 43.584 | 1.00 | 1.625 | 53.2 | 0.5539 |
| 15 | 21.111 | (Variable) | | | |
| 16 | −13.764 | 1.45 | 1.854 | 23.8 | 0.6204 |
| 17 | 69.046 | 8.00 | 1.605 | 60.6 | 0.5449 |
| 18 | −20.352 | 0.15 | | | |
| 19 | 746.047 | 6.03 | 1.699 | 55.5 | 0.5434 |
| 20 | −37.707 | (Variable) | | | |
| 21 | 82.906 | 6.06 | 1.812 | 25.4 | 0.6161 |
| 22 | −94.973 | 5.00 | | | |
| 23 | inf. | 30.03 | 1.518 | 64.1 | 0.5353 |
| 24 | inf. | 2.50 | | | |

Distance Data

| | W | T |
|---|---|---|
| d6 | 7.41 | 1.22 |
| d11 | 8.90 | 7.26 |
| d13 | 0.70 | 4.66 |
| d15 | 7.58 | 6.74 |
| d20 | 0.65 | 5.37 |

Numerical Example 2 f: 37.0~47.9 FNO: 1.70~1.99 ω: 22.89~18.03

| | ri | di | Ni | vi | $\theta_{gfi}$ |
|---|---|---|---|---|---|
| 1 | 109.210 | 2.10 | 1.615 | 58.7 | 0.5449 |
| 2 | 31.189 | 8.92 | | | |
| 3 | −91.293 | 1.90 | 1.489 | 70.2 | 0.5300 |
| 4 | 90.529 | 0.71 | | | |
| 5 | 63.301 | 3.35 | 1.839 | 37.2 | 0.5776 |
| 6 | 179.144 | (Variable) | | | |
| 7 | 167.261 | 5.25 | 1.839 | 42.7 | 0.5637 |
| 8 | −89.855 | 0.15 | | | |
| 9 | 58.151 | 4.41 | 1.839 | 37.2 | 0.5776 |
| 10 | 569.021 | 1.18 | | | |
| 11 | −174.040 | 1.65 | 1.854 | 23.9 | 0.6204 |

-continued

| | ri | di | Ni | vi | $\theta_{gfi}$ |
|---|---|---|---|---|---|
| 12 | 636.179 | (Variable) | | | |
| 13 | 35.715 | 4.75 | 1.699 | 55.5 | 0.5434 |
| 14 | −112.024 | (Variable) | | | |
| 15 | 903.306 | 1.15 | 1.768 | 26.5 | 0.6136 |
| 16 | 22.234 | (Variable) | | | |
| 17 | −16.990 | 1.50 | 1.812 | 25.4 | 0.6161 |
| 18 | 103.311 | 8.91 | 1.661 | 50.9 | 0.5560 |
| 19 | −25.640 | 0.15 | | | |
| 20 | −325.580 | 5.49 | 1.661 | 50.9 | 0.5560 |
| 21 | −41.802 | (Variable) | | | |
| 22 | 82.451 | 6.37 | 1.768 | 26.5 | 0.6136 |
| 23 | −103.161 | 4.80 | | | |
| 24 | inf. | 30.00 | 1.518 | 64.1 | 0.5353 |
| 25 | inf. | 0.00 | | | |
| 26 | inf. | 0.70 | 1.763 | 55.0 | |
| 27 | inf. | 0.00 | | | |
| 28 | inf. | 0.40 | 1.502 | 65.0 | |
| 29 | inf. | 0.00 | | | |
| 30 | inf. | 2.30 | 1.492 | 65.0 | |
| 31 | inf. | | | | |

Distance Data

| | W | T |
|---|---|---|
| d6 | 14.71 | 1.46 |
| d12 | 15.27 | 15.87 |
| d14 | 1.31 | 2.87 |
| d16 | 10.34 | 13.21 |
| d21 | 0.50 | 8.73 |

Numerical Example 3 f: 30.9~37.8 FNO: 1.90~2.18 ω: 26.67~22.30

| | ri | di | Ni | vi | $\theta_{gfi}$ |
|---|---|---|---|---|---|
| 1 | 50.696 | 1.80 | 1.585 | 59.4 | 0.5434 |
| 2 | 20.444 | 8.07 | | | |
| 3 | −115.739 | 1.60 | 1.524 | 59.8 | 0.5440 |
| 4 | 41.495 | 0.47 | | | |
| 5 | 32.645 | 3.41 | 1.839 | 37.2 | 0.5776 |
| 6 | 67.728 | (Variable) | | | |
| 7 | 49.413 | 4.79 | 1.839 | 37.2 | 0.5776 |
| 8 | −195.990 | 0.15 | | | |
| 9 | 46.529 | 6.23 | 1.839 | 37.2 | 0.5776 |
| 10 | −38.652 | 1.50 | 1.854 | 23.8 | 0.6204 |
| 11 | 109.615 | (Variable) | | | |
| 12 | 85.494 | 2.74 | 1.489 | 70.2 | 0.5300 |
| 13 | −110.816 | (Variable) | | | |
| 14 | 50.986 | 1.00 | 1.518 | 64.1 | 0.5353 |
| 15 | 19.862 | (Variable) | | | |
| 16 | −13.668 | 1.35 | 1.854 | 23.8 | 0.6204 |
| 17 | 83.143 | 8.16 | 1.605 | 60.6 | 0.5449 |
| 18 | −20.398 | 0.15 | | | |
| 19 | −2553.024 | 5.69 | 1.839 | 37.2 | 0.5776 |
| 20 | −41.401 | (Variable) | | | |
| 21 | 97.125 | 6.20 | 1.839 | 37.2 | 0.5776 |
| 22 | −85.514 | 5.00 | | | |
| 23 | inf. | 30.03 | 1.518 | 64.1 | 0.5353 |
| 24 | inf. | 2.52 | | | |

Distance Data

| | W | T |
|---|---|---|
| d6 | 8.80 | 1.16 |
| d11 | 8.37 | 7.57 |
| d13 | 1.02 | 4.11 |
| d15 | 7.90 | 7.02 |
| d20 | 0.65 | 6.88 |

Numerical Example 4 f: 30.8~37.0 FNO: 1.90~2.21 ω: 26.75~22.74

| | ri | di | Ni | vi | $\theta_{gfi}$ |
|---|---|---|---|---|---|
| 1 | 50.422 | 1.80 | 1.585 | 59.4 | 0.5434 |
| 2 | 20.305 | 8.33 | | | |

-continued

| | | | | | |
|---|---|---|---|---|---|
| 3 | −85.679 | 1.55 | 1.489 | 70.2 | 0.5300 |
| 4 | 34.782 | 0.70 | | | |
| 5 | 32.941 | 3.21 | 1.839 | 37.2 | 0.5776 |
| 6 | 63.214 | (Variable) | | | |
| 7 | 46.808 | 5.39 | 1.839 | 37.2 | 0.5776 |
| 8 | −125.458 | 4.06 | | | |
| 9 | 40.829 | 6.45 | 1.839 | 37.2 | 0.5776 |
| 10 | −30.728 | 1.35 | 1.854 | 23.8 | 0.6204 |
| 11 | 95.500 | (Variable) | | | |
| 12 | 351.139 | 2.60 | 1.489 | 70.2 | 0.5300 |
| 13 | −73.840 | (Variable) | | | |
| 14 | 37.539 | 1.00 | 1.620 | 49.8 | 0.5603 |
| 15 | 20.131 | (Variable) | | | |
| 16 | −13.771 | 1.45 | 1.854 | 23.8 | 0.6204 |
| 17 | 71.642 | 8.08 | 1.605 | 60.6 | 0.5449 |
| 18 | −20.612 | 0.15 | | | |
| 19 | −348.059 | 5.52 | 1.699 | 55.5 | 0.5434 |
| 20 | −37.013 | (Variable) | | | |
| 21 | 76.357 | 6.43 | 1.812 | 25.4 | 0.6161 |
| 22 | −82.064 | 5.00 | | | |
| 23 | inf. | 30.03 | 1.518 | 64.1 | 0.5353 |
| 24 | inf. | 2.48 | | | |

Distance Data

| | W | T |
|---|---|---|
| d6 | 6.99 | 1.24 |
| d11 | 6.18 | 4.35 |
| d13 | 0.70 | 5.47 |
| d15 | 7.75 | 6.95 |
| d20 | 0.65 | 4.25 |

Numerical Example 5 f: 28.2~34.5 FNO: 1.90~2.14 ω: 28.83~24.20

| | ri | di | Ni | vi | $\theta_{gfi}$ |
|---|---|---|---|---|---|
| 1 | 50.666 | 1.80 | 1.585 | 59.4 | 0.5434 |
| 2 | (Aspherical Surface) | 8.65 | | | |
| 3 | −119.715 | 1.60 | 1.524 | 59.8 | 0.5440 |
| 4 | 38.654 | 0.90 | | | |
| 5 | 34.461 | 3.71 | 1.839 | 37.2 | 0.5776 |
| 6 | 92.514 | (Variable) | | | |
| 7 | 53.338 | 4.38 | 1.839 | 37.2 | 0.5776 |
| 8 | −360.527 | 0.15 | | | |
| 9 | 53.074 | 6.20 | 1.839 | 37.2 | 0.5776 |
| 10 | −37.461 | 1.50 | 1.854 | 23.8 | 0.6204 |
| 11 | 289.836 | (Variable) | | | |
| 12 | −861.091 | 2.55 | 1.489 | 70.2 | 0.5300 |
| 13 | −54.636 | (Variable) | | | |
| 14 | 48.701 | 1.00 | 1.518 | 64.1 | 0.5353 |
| 15 | 21.221 | (Variable) | | | |
| 16 | −14.003 | 1.35 | 1.854 | 23.8 | 0.6204 |
| 17 | 77.765 | 7.74 | 1.605 | 60.6 | 0.5449 |
| 18 | −19.904 | 0.15 | | | |
| 19 | −677.154 | 5.00 | 1.839 | 37.2 | 0.5776 |
| 20 | −42.833 | (Variable) | | | |
| 21 | 89.967 | 6.35 | 1.839 | 37.2 | 0.5776 |
| 22 | −76.622 | 5.00 | | | |
| 23 | inf. | 30.03 | 1.518 | 64.1 | 0.5353 |
| 24 | inf. | 2.52 | | | |

Distance Data

| | W | T |
|---|---|---|
| d6 | 9.05 | 1.14 |
| d11 | 9.08 | 9.33 |
| d13 | 0.77 | 3.56 |
| d15 | 7.29 | 6.42 |
| d20 | 0.65 | 6.40 |

-continued

Aspherical Surface Data

| | c(l/r) | k | A | B | C | D |
|---|---|---|---|---|---|---|
| 2 | 5.023e−02 | −1.303e−01 | 1.148e−06 | −7.510e−09 | 2.845e−11 | −3.198e−14 |

| Conditional | Numerical Example | | | | |
|---|---|---|---|---|---|
| Expression | 1 | 2 | 3 | 4 | 5 |
| (1)$O_1/L_1$ | 0.29 | 0.17 | 0.25 | 0.30 | 0.17 |
| (2)$\theta_{gF}-(0.6438-0.001682\ \nu_d)$ | 0.015 | 0.014 | −0.004 | 0.015 | −0.004 |
| (3)$N_{58p}$ | 1.70 | 1.69 | 1.76 | 1.70 | 1.76 |
| (4)$-\beta_{23W}$ | 0.72 | 0.38 | 0.64 | 0.77 | 0.64 |
| (5)$\beta_{4W}$ | 1.72 | 3.70 | 1.79 | 1.65 | 1.73 |
| (6)$f_6/f_W$ | 1.82 | 1.66 | 1.81 | 1.63 | 1.81 |
| (7)$N_{6p}$ | 1.81 | 1.76 | 1.83 | 1.81 | 1.83 |

Figure 12:
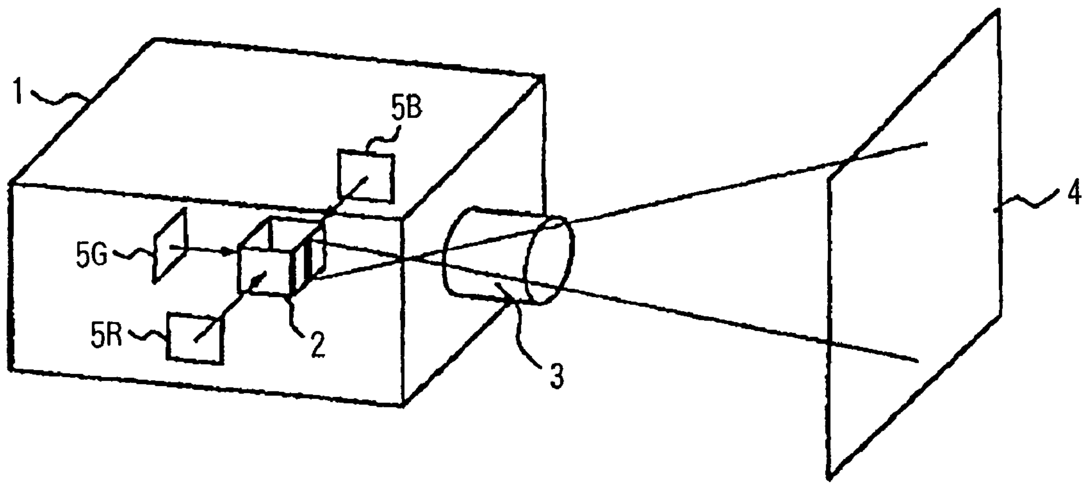
FIG. 12 is a schematic view of main parts when the image projection apparatus of the present invention is applied to a color liquid crystal projector.

FIG. 12 is a schematic view of main parts according to an embodiment of an image projection apparatus of the present invention.

FIG. 12 shows the image projection apparatus which applies the aforementioned zoom lens to a three-plate type color liquid crystal projector, combines image information on a plurality of color light components based on a plurality of liquid crystal display elements through color combining system and magnifies and projects the combined image information onto a screen surface using the projection lens. In FIG. 12, a color liquid crystal projector 1 combines RGB color light components from three liquid crystal panels 5B, 5G, 5G of R, G, B colors into one optical path using a prism 2 as the color combining system and projects the color light components onto a screen 4 using a projection lens 3 made up of the aforementioned zoom lens.

Figure 13:
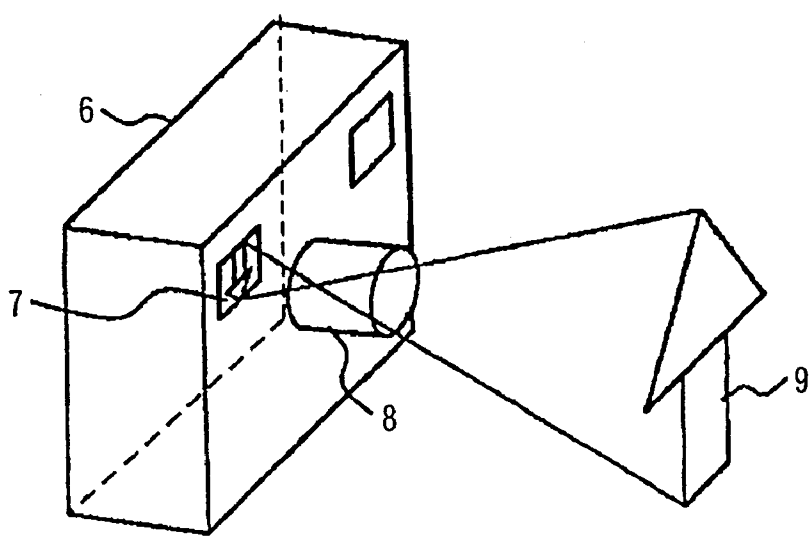
FIG. 13 is a schematic view of main parts of an embodiment of an optical apparatus of the present invention.

FIG. 13 is a schematic view of main parts of an embodiment of an optical apparatus of the present invention. This embodiment illustrates an example where the aforementioned zoom lens is applied to an optical apparatus including an image-taking apparatus such as a video camera, film camera or digital camera as the image-taking lens.

In FIG. 13, the image of an object 9 is formed on a photosensitive body 7 using an image-taking lens 8 and image information is obtained.

According to the present invention, it is possible to reduce the size of an entire lens system, effectively correct various types of aberration accompanying zooming and to realize a zoom lens and an image projection apparatus using the zoom lens preferably applicable to a liquid crystal projector having preferably optical performance over the entire screen.

In addition, the present invention can also realize a zoom lens preferable applicable to an optical apparatus such as a video camera, film camera or digital camera forming image information on image-pickup surface such as a film and CCD.

While preferred embodiments have been described, it is to be understood that modification and variation of the present invention may be made without departing from the scope of the following claims.

This application claims priority from Japanese Patent Application No. 2003-207159 filed on Aug. 11, 2003 which is hereby incorporated by reference herein.

What is claimed is:

1. A zoom lens comprising, in order from a front side to a rear side:

a first lens unit having a negative refractive power;

a second lens unit having a positive refractive power;

a third lens unit having a positive refractive power;

a fourth lens unit having a negative refractive power;

a fifth lens unit; and a sixth lens unit having a positive refractive power, the sixth lens unit including at least one positive lens element, wherein at least four lens units move during zooming from a wide-angle end to a telephoto end and the zoom lens satisfies the following conditions:

$$0.00<o1/L1<0.38$$

$$-0.015<\theta gF-(0.6438-0.001682\nu d)<0.04$$

where o1 represents a distance from a surface vertex on the most front side of the first lens unit to a position of a principal plane on the front side, L1 represents an overall length of the first lens unit, νd represents an average Abbe number of a material of the at least one positive lens element of the sixth lens unit and is defined as νd=(nd−1)/(nF−nC), θgF represents an average partial dispersion ratio of a material of the at least one positive lens element of the sixth lens unit and is defined as θgF=(ng−nF)/(nF−nC), and ng, nd, nF, nC represent refractive indices of the material with g-, d-, F-, C-lines.

2. The zoom lens according to claim 1, wherein the fifth lens unit has at least one positive lens element and the zoom lens satisfies the following condition:

$$1.62<N56p<1.85$$

where N56p represents an average refractive index of a material of at least one positive lens element of the fifth lens unit and a material of the at least one positive lens element of the sixth lens unit.

3. The zoom lens according to claim 1, wherein both the first and sixth lens units are fixed for zooming.

4. The zoom lens according to claim 1, wherein the second to fifth lens units move to the front side during zooming from the wide-angle end to the telephoto end.

5. The zoom lens according to claim 1, wherein the following condition is satisfied:

$$0.1<-\beta 23w<1.0$$

where β23w represents an image formation magnification of a combination of the second and third lens units at the wide-angle end.

6. The zoom lens according to claim 1, wherein the following condition is satisfied:

$$1<\beta 4w<5$$

where β4w represents an image formation magnification of the fourth lens unit at the wide-angle end.

7. The zoom lens according to claim 1, wherein the fifth lens unit consists of a negative lens element whose both lens surfaces are concave and at least two positive lens elements in order from the front side to the rear side.

8. The zoom lens according to claim 1, wherein the following condition is satisfied:

$$1.2<f6/fw<3.0$$

where fw represents a focal length of the entire system at the wide-angle end and f6 represents a focal length of the sixth lens unit.

9. The zoom lens according to claim 1, wherein the following condition is satisfied:

$$1.70<N6p<1.85$$

where N6p represents an average refractive index of the material of the at least one positive lens element of the sixth lens unit.

10. An image projection apparatus comprising:

an image display element; and the zoom lens according to claim 1, wherein the zoom lens projects an image displayed on the image display element onto a projection surface.

11. A zoom lens comprising, in order from a front side to a rear side:

a first lens unit having a negative refractive power;

a second lens unit having a positive refractive power;

a third lens unit having a positive refractive power;

a fourth lens unit having a negative refractive power;

a fifth lens unit including at least one positive lens element; and a sixth lens unit having a positive refractive power, the sixth lens unit including at least one positive lens element, wherein at least four lens units move during zooming from a wide-angle end to a telephoto end and the zoom lens satisfies the following conditions:

$$0.00<o1/L1<0.38$$

$$1.62<N56p<1.85$$

where o1 represents a distance from a surface vertex on the most front side of the first lens unit to a position of a principal plane on the front side, L1 represents an overall length of the first lens unit, and N56p represents an average refractive index of a material of the at least one positive lens element of the fifth lens unit and a material of the at least one positive lens element of the sixth lens units.

12. The zoom lens according to claim 11, wherein both the first and sixth lens units are fixed for zooming.

13. The zoom lens according to claim 11, wherein the second to fifth lens units move to the front side during zooming from the wide-angle end to the telephoto end.

14. The zoom lens according to claim 11, wherein the following condition is satisfied:

$$0.1<-\beta 23w<1.0$$

where β23w represents an image formation magnification of a combination of the second and third lens units at the wide-angle end.

15. The zoom lens according to claim 11, wherein the following condition is satisfied:

$$1<\beta 4w<5$$

where β4w represents an image formation magnification of the fourth lens unit at the wide-angle end.

16. The zoom lens according to claim 11, wherein the fifth lens unit consists of a negative lens element whose both lens surfaces are concave and at least two positive lens element in order from the front side to the rear side.

17. The zoom lens according to claim 11, wherein the following condition is satisfied:

$$1.2<f6/fw<3.0$$

where fw represents a focal length of the entire system at the wide-angle end and f6 represents a focal length of the sixth lens unit.

18. The zoom lens according to claim 11, wherein the following condition is satisfied:

$$1.70 < N6p < 1.85$$

where N6p represents an average refractive index of the material of the at least one positive lens element of the sixth lens unit.

19. An image projection apparatus comprising:

an image display element; and the zoom lens according to claim 11, wherein the zoom lens projects an image displayed on the image display element onto a projection surface.

* * * * *